United States Patent [19]
Dickson

[11] Patent Number: 6,062,264
[45] Date of Patent: May 16, 2000

[54] INSTALLING A PIPE IN AN EXISTING PIPELINE

[75] Inventor: Dudley Trevor Dickson, Whitley Bay, United Kingdom

[73] Assignee: BG plc, Reading, United Kingdom

[21] Appl. No.: 08/930,343

[22] PCT Filed: Apr. 3, 1996

[86] PCT No.: PCT/GB96/00822

§ 371 Date: May 28, 1998

§ 102(e) Date: May 28, 1998

[87] PCT Pub. No.: WO96/31726

PCT Pub. Date: Oct. 10, 1996

[30] Foreign Application Priority Data

Apr. 4, 1995 [GB] United Kingdom .................. 9506949

[51] Int. Cl.[7] .................................................. F16L 55/165
[52] U.S. Cl. .................................. 138/98; 138/97; 138/89
[58] Field of Search ............................ 138/97, 98, 93, 138/89

[56] References Cited

U.S. PATENT DOCUMENTS

| 3,898,918 | 8/1975 | Carter | 138/93 |
|---|---|---|---|
| 4,418,572 | 12/1983 | Prange | 138/97 |
| 4,458,721 | 7/1984 | Yie et al. | 138/89 |
| 4,754,781 | 7/1988 | Jan de Putter | 138/97 |
| 5,241,993 | 9/1993 | Stephens | 138/97 |
| 5,427,154 | 6/1995 | Stephens | 138/97 |
| 5,477,886 | 12/1995 | Van Beugen et al. | 138/89 |
| 5,482,076 | 1/1996 | Taylor et al. | 138/97 |

FOREIGN PATENT DOCUMENTS

| 0 167 986 A2 | 1/1985 | European Pat. Off. . |
|---|---|---|
| 0 543 458 A1 | 5/1993 | European Pat. Off. . |
| 24 57 412 | 10/1976 | Germany . |
| 1 657 834 | 6/1991 | U.S.S.R. . |
| 2 167 830 | 6/1988 | United Kingdom . |
| 2 227 071 | 7/1990 | United Kingdom . |
| 2 290 121 | 12/1995 | United Kingdom . |

OTHER PUBLICATIONS

Derwent Publications Ltd., 92–173681, London, Great Britain, Jun. 1991.

Primary Examiner—James Hook
Attorney, Agent, or Firm—Larson & Taylor

[57] ABSTRACT

A seal is fed into an existing pipe. Manipulation of an elongate assembly deploys the seal and engages the seal body with the end of the pipe. A plastic pipe is advanced into the pipe, and the space between the existing pipe and the plastic pipe is filled with sealant. The elongate assembly is withdrawn.

18 Claims, 8 Drawing Sheets

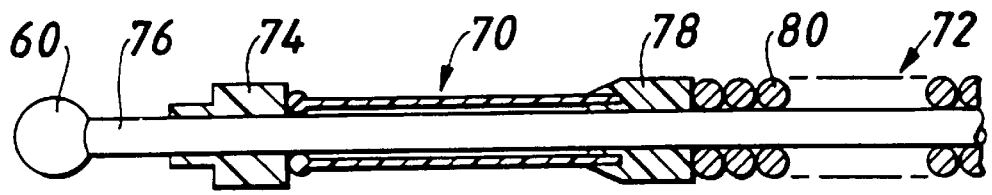
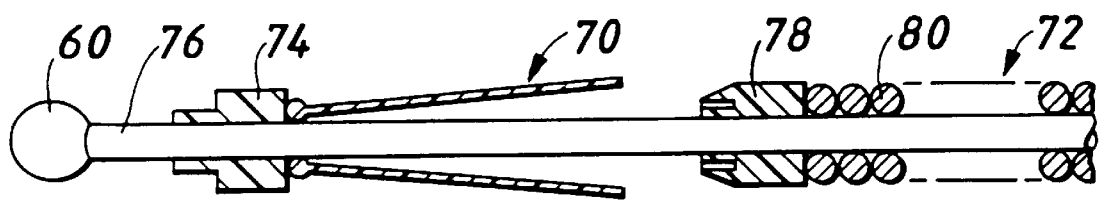
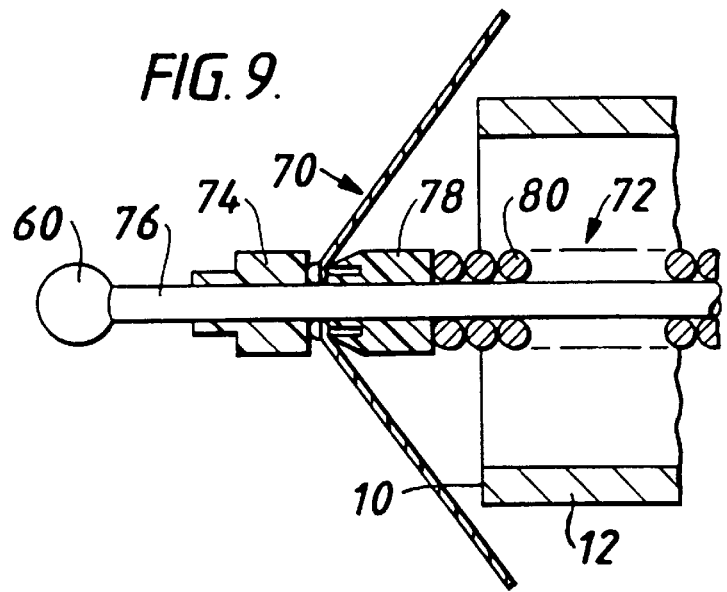

INSTALLING A PIPE IN AN EXISTING PIPELINE

This invention relates to installing pipes. More particularly, the invention relates to installing a plastic service pipe in an existing service pipe. Typically, the service pipe is a steel gas service pipe but the invention is not limited to such an application but is applicable to water, fluid waste disposal or other service pipes, for example.

A method is known for installing a plastic service pipe in an existing steel service pipe extending from a main to a meter. The meter is removed and a plastic service pipe is inserted through the open end of the steel service pipe and advanced up to a point adjacent the main. The plastic pipe has a sealing head at its leading end. Fluid sealant is fed to the space between the plastic pipe and the steel service pipe. The sealing head sealingly engages the interior of the steel service pipe and has a seal. When the fluid sealant has solidified the seal is broken by the pointed end of a flexible rod inserted through the plastic pipe.

In such a known method the plastic service pipe has a cylindrical wall. The plastic service pipe has some flexibility allowing it to be inserted past a swept bend between the vertical and horizontal runs of the steel service pipe.

The known method was applicable to low pressure systems in which the force due to the gas pressure in the steel pipe acting on the sealing head was relatively small. The plastic service pipe could therefore be manually advanced through the existing service pipe without difficulty.

For higher pressure systems, for example those operating at up to 7 bar the force due to the gas pressure in the steel pipe which would act on a sealing head would be too great for the plastic service pipe to be manually advanced through the existing service pipe.

The object of the present invention is to provide a method of installing a plastic pipe in an existing service pipe in which excessive forces due to fluid pressure are avoided.

According to the invention, a method of installing a plastic service pipe in an existing service pipe which extends from a main (or from a tee connected to a main) to an accessible end comprises sealing the existing pipe using a seal deployed by an elongate flexible assembly which is fed into the existing pipe through said accessible end, placing sealant in the space between said existing pipe and said plastic service pipe and withdrawing said elongate flexible assembly.

Said seal when deployed engages an end of said existing pipe or an end of said tee in said main.

Alternatively, said seal when deployed engages an inside wall surface of said existing pipe or of said tee adjacent said main.

Apparatus for use in performing said method comprises an elongate flexible assembly having a flexible wire surrounded by a flexible sleeve.

Said seal comprises ribs pivotally connected at their inner ends to the lead end of said sleeve, the outer ends of said ribs being engageable with a lock body connected to said wire, said seal being deployed by manipulation of said flexible assembly and said seal being advanced through said existing pipe in retracted condition with the outer ends of said ribs engaging said lock body and being deployed by release of said outer ends of said ribs and by movement of said lock body against said ribs to push them into an open position and by movement of said lock body towards said existing service pipe.

Alternatively, said seal comprises ribs pivotally connected at their inner ends to a body secured to said wire, the outer ends of said ribs being engageable with a lock body secure to the leading end of said sleeve, said seal being deployed by manipulation of said flexible assembly and said seal being advanced through said existing pipe in retracted condition with the outer ends of said ribs engaging said lock body and being deployed by release of said outer ends of said ribs and by movement of said lock body against said ribs and movement of said body secured to said wire towards said existing service pipe.

Alternatively, said seal is circular but is held in tension in a deformed elongated elliptical form by a former arranged between said sleeve and said wire during feeding of said flexible assembly into said existing pipe, said seal being deployed by relative motion of said sleeve and said wire which breaks said former, said seal assuming a circular shape, and being axially compressed by operation of said flexible assembly between a nose-piece carried by the leading end of said plastic pipe and a washer connected to said wire, said nose-piece engaging the forward end of said sleeve.

Alternatively, said seal is in the form of an inflatable bag and extending between two bodies one being connected to said wire and the other engaging the forward end of said sleeve.

Alternatively, said seal is connected by a frangible bond to a body connected to said wire and, upon shearing of said frangible bond by manipulation of said flexible means, said seal being forced outwardly by a nose-shaped surface on a nose-piece carried by the leading end of said plastic pipe, which nose-piece has an internal step engaged by the leading end of said sleeve.

Alternatively, said seal is mounted on said sleeve, adjacent the leading end thereof and being held by frangible filaments in a folded condition during advance of said flexible assembly through said existing pipe, said filaments being broken by manipulation of said flexible assembly to allow said seal to deploy by unfolding to assume an annular shape.

Embodiments of the method and apparatus for performing it will now be described by way of example with reference to the accompanying drawings in which:

FIGS. 7 to 10 show part of a second embodiment of flexible assembly carrying a second embodiment of seal in successive stages of operation from retracted to fully deployed condition, in longitudinal section;

Figure 16:
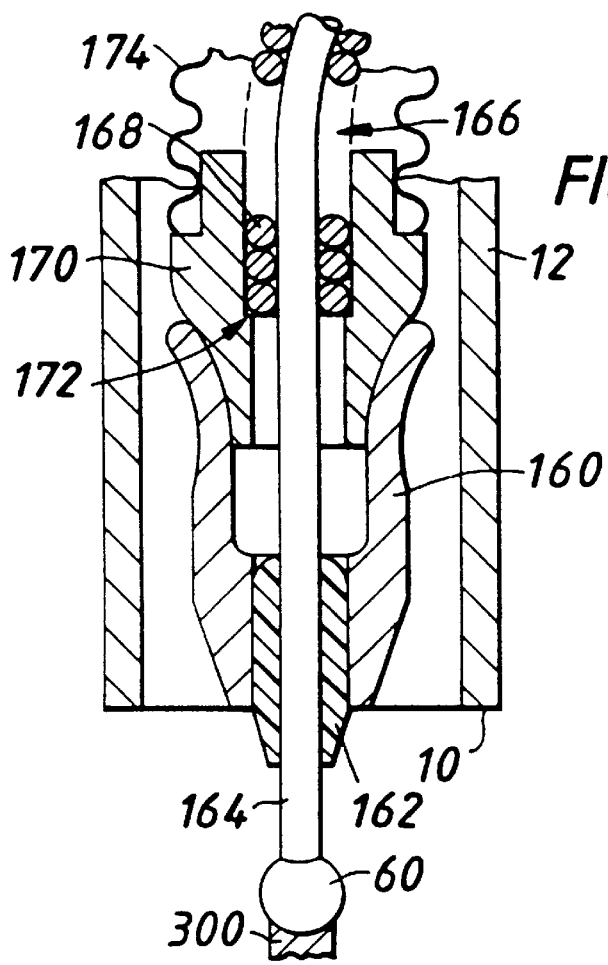
Figure 18:
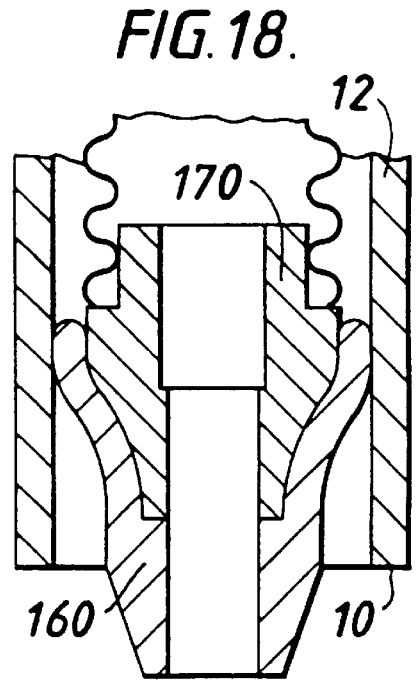
Figure 17:
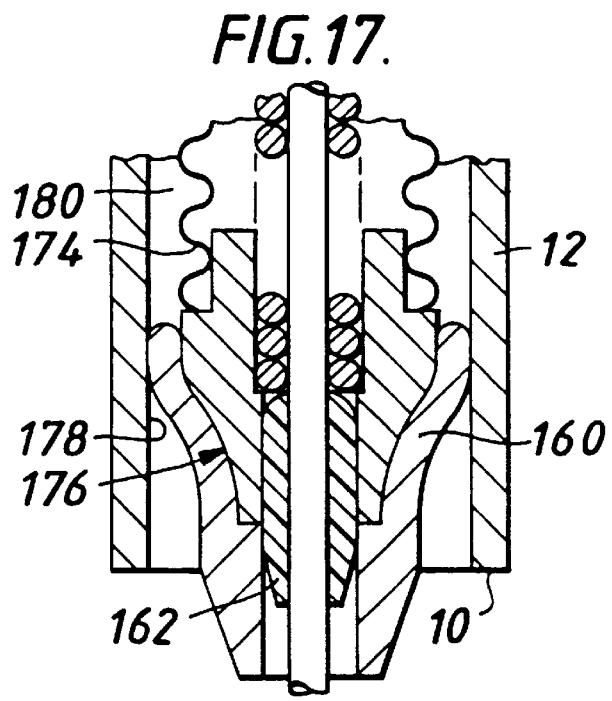

FIGS. 16 to 18 show part of a sixth embodiment of elongate flexible assembly and a sixth embodiment of seal in successive stages of operation from fully retracted to fully deployed, in longitudinal section; and FIGS. 19 to 22 show part of a seventh embodiment of elongate flexible assembly and seventh embodiment of seal in successive stages of operation from fully retracted to fully deployed, in longitudinal section.

Figure 1:
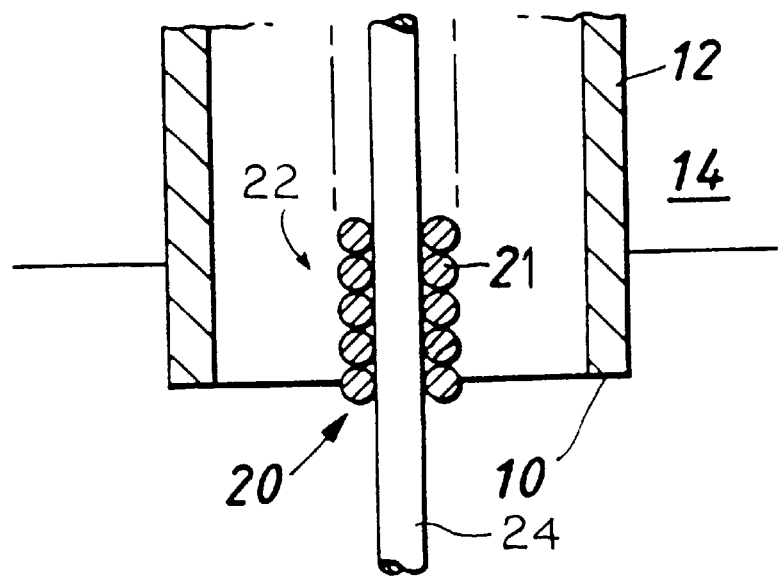
FIG. 1 shows a vertical cross-section of part of the end of the existing service pipe opposite to the accessible end.

FIG. 1 shows an end 10 of an existing steel pipe 12 which terminates in a main 14. An alternative arrangement is where the existing pipe is connected to a tee and the tee is connected to the main 14. In that case, the end 10 is considered to represent the end of the tee where it terminates in the main 14.

In order to install a plastic service pipe in the existing pipe, the meter control valve in the domestic or business premises at which the existing pipe terminates would first of all be replaced by a ball valve as described for example in our co-pending UK patent application No. 9502164.8 the contents of which are incorporated herein by reference. This enables an elongate flexible assembly 20 (indicated in FIG. 1 in ghost outline) to be inserted in the existing pipe 12 and manipulated beyond the accessible end of the existing pipe 12. The assembly 20 principally comprises an outer sleeve 22 formed of coiled wire 21 and an inner wire 24.

Figure 2:
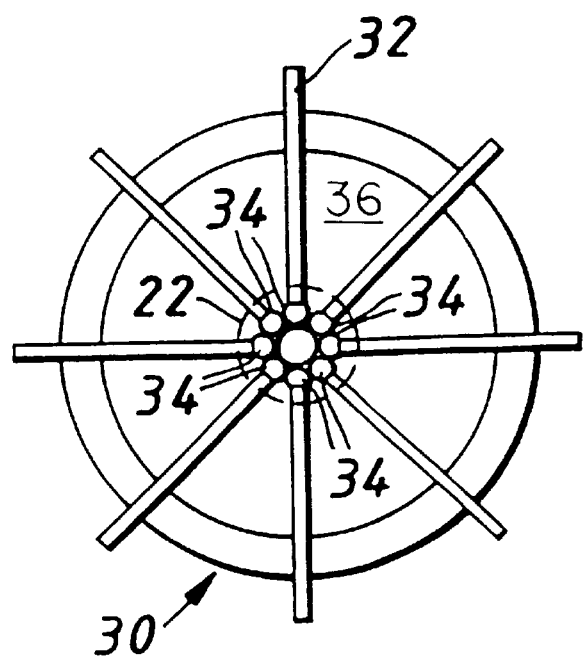
FIG. 2 shows an end view of a seal deployed of the end of a pipe shown in FIG. 1.

The assembly 20 carries at its inner end a seal 30 shown deployed in FIG. 2. The deployed seal 30 has the shape of an umbrella. The seal 30 consists of ribs 32 which are pivotally connected to the end of the sleeve 22 at 34. The ribs 32 are inter-connected by a conical tough film 36 of plastic such as polyurethane. By operation of the sleeve 22 and the wire 24 of the elongate assembly 20, the seal 30 can be fed down the existing pipe 12 from the accessible end in retracted condition and in the presence of gas at high pressure (for example up to 7 bar). The seal 30 eventually passes beyond the end 10 of the existing service pipe 12 and, by further manipulation of the assembly 20, can be deployed to the condition shown in FIG. 2 and can then seal against the end 10. At this stage the pipe 12 is tested to prove that the seal is effective. The wire 24 is held in position at the accessible end of the existing pipe 12 by a series of releasable mechanical locks.

Figure 3:
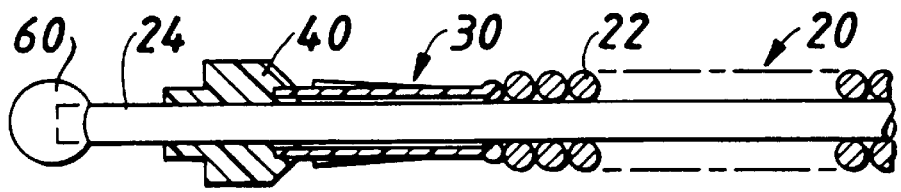
FIGS. 3 to 6 show part of a first embodiment of an elongate flexible assembly carrying a seal as shown in FIG. 2 in successive stages of operation from retracted to fully deployed condition, in longitudinal section.

FIGS. 3 to 6 show further details of the seal 30 and the assembly 20. In FIG. 3 the seal 30 is shown in retracted condition, the outer ends of the ribs 32 being trapped by a lock 40 clamped to the wire 24.

Figure 4:
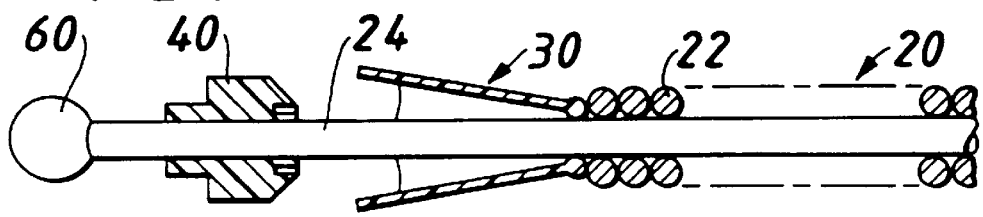

FIG. 4 shows the release of the ribs 32 by advancement of the wire 24 relatively to the sleeve 22.

Figure 5:
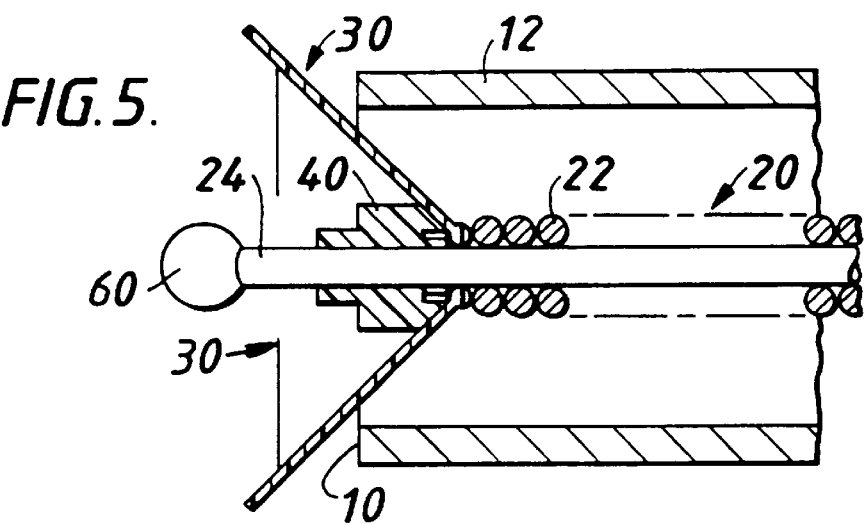

FIG. 5 shows the deployment of the seal 30 by retraction of the wire 24 relatively to the sleeve 22 and engagement of the lock 40 with the ribs 32.

Figure 6:
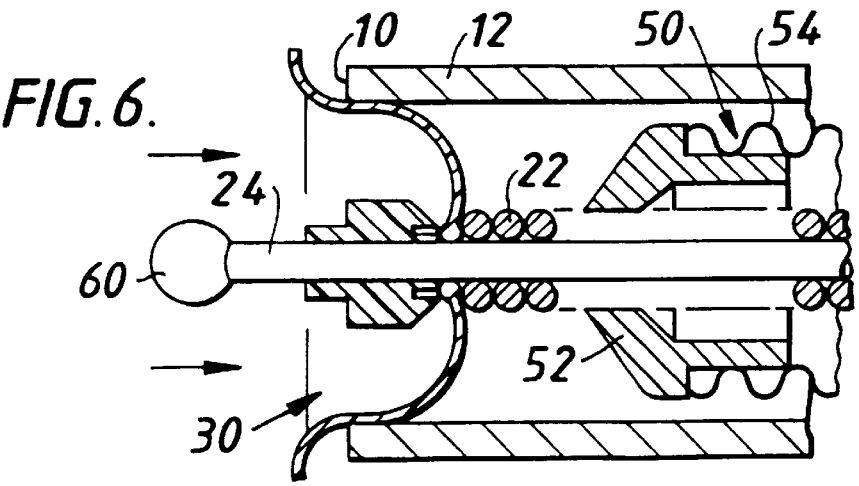
Figure 10:
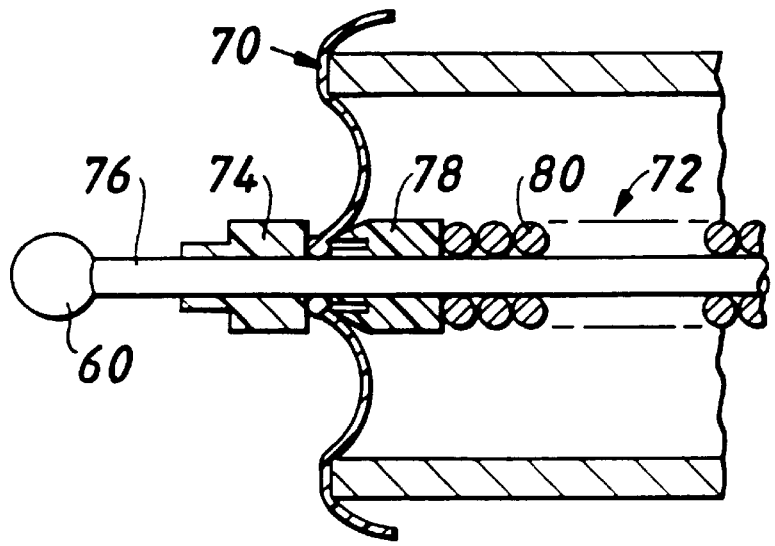

FIG. 6 shows how the gas pressure acts on the left-hand side of the seal 30 and deforms it into the shape shown. In this condition gas flow from the main 14 into the existing pipe 12 through the end 10 is prevented.

The next stage of the method of installing the plastic pipe in the existing pipe 12 comprises feeding the plastic pipe 50 into the existing pipe 12 through the accessible end. The plastic pipe preferably comprises a corrugated pipe 50 as shown. However, the pipe 50 may comprise a corrugated pipe having means to provide a smooth or substantially smooth bore, such as an inner liner; or the pipe may be a pipe having a cylindrical wall. The details of the construction of the pipe do not form part of the present invention.

The pipe 50 carries an annular nose-piece 52 made for example of brass or of plastic through which the sleeve 22 protrudes. The plastic pipe 50 is fed into the existing pipe 12 between it and the sleeve 22 of the elongate assembly which acts as a guide to the plastic pipe 50 during this stage.

Once the plastic pipe 50 has been positioned in the existing pipe 12, the space 54 between the existing pipe 12 and the plastic pipe 50 is filled with fluid sealant which is subsequently allowed to set.

The seal 30 is collapsed by manipulation of the elongate assembly 20 and is then withdrawn, together with the assembly 20, from the existing pipe 12. Finally, the ball valve is removed and the meter control valve is replaced.

FIGS. 3–6 show a bead 60 which contains a light source or sources and light detectors which are connected to a circuit as described in cur co-pending UK patent application No. 9503678.6, the contents of which are incorporated herein by reference. By observation of the alarm activated by the circuit described in 9503678.6, the entry of the seal 30 into the main 14 can be accurately known.

A second embodiment of seal 70 and elongate assembly 72 is shown in FIGS. 7–10. In this embodiment the ribs of the seal 70 are pivotally connected to a block 74 clamped to the wire 76 of the assembly 72. The ends of the ribs are held in the retracted condition of the seal 70 in a block 78 attached to the end of the sleeve 80 of the assembly 72.

FIG. 9 shows the action of the block 78 which forces the ribs to the open condition by manipulation of the assembly 72. The seal 70 then has the shape of an umbrella.

After the space between the existing pipe 12 and the plastic pipe (not shown) has been filled with sealant, the seal 70 is collapsed and the assembly 72 are withdrawn as before.

Figure 11:
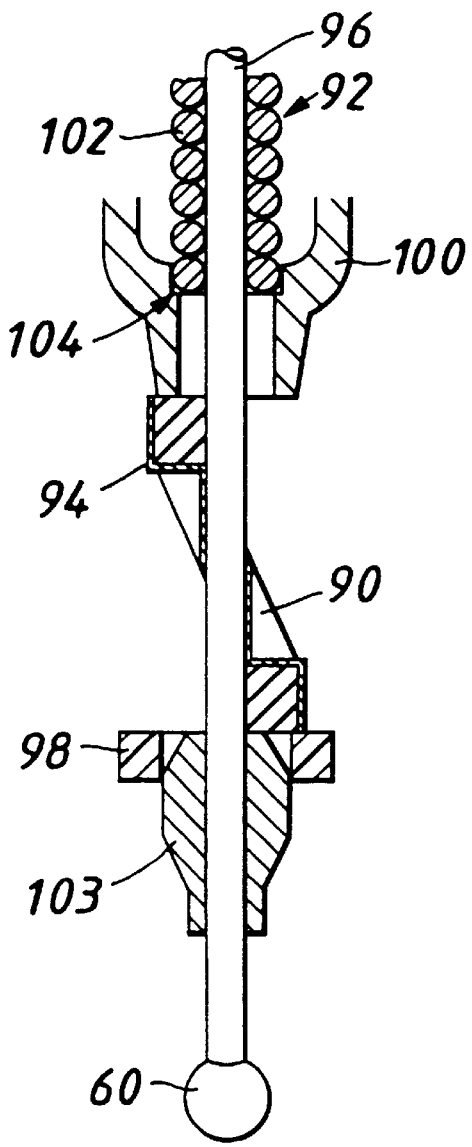
FIGS. 11 to 13 show part of a third embodiment of elongate flexible assembly and a third embodiment of seal in successive stage of operation from fully retracted to fully deployed condition, in longitudinal section.
Figure 12:
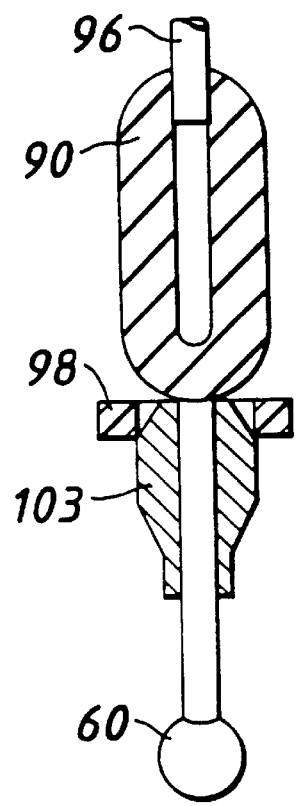
Figure 13:
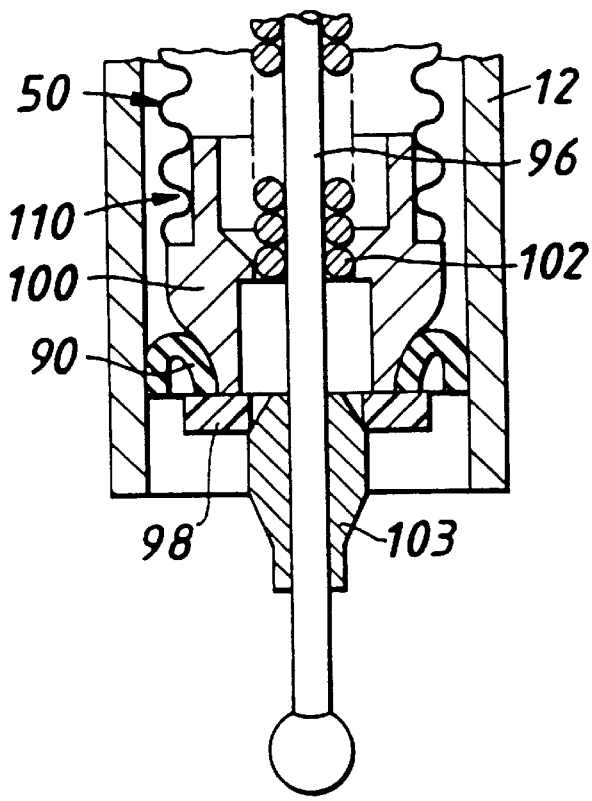

A third embodiment of seal 90 and elongate assembly 92 is shown in FIGS. 11–13. In this embodiment the seal 90 is of rubber and is slightly smaller in diameter than the bore of the existing service pipe 12. The seal 90 is held in pretension in the retracted condition (shown in FIGS. 11 and 12) by a plastic former 94. When the seal 90 has been correctly positioned within the existing service pipe 12, the former 94 is broken by manipulation of the wire 96. The wire 96 is then withdrawn to put the seal 90 into compression. The annular compression washer 98 which is fixed to the wire 96 compresses the seal 90 against the nose-piece 100 which in this embodiment is mounted on the end of the sleeve 102. A step 104 in the bore of the nose-piece 100 prevents the nose-piece 100 from moving along the sleeve 102.

Compression of the seal 90 causes it to expand beyond its natural outer diameter to sealingly engage with the inside wall surface of the existing pipe 12, or of the tee.

In this embodiment, the plastic pipe 50 is inserted in the existing pipe 12 at the same time as the elongate assembly 92. The assembly 92 includes a steel bead 104 which is clamped to the wire 96.

After the space 110 has been filled with sealant, the elongate assembly 92 is withdrawn. The seal 90 in this case is left behind.

Figure 14:
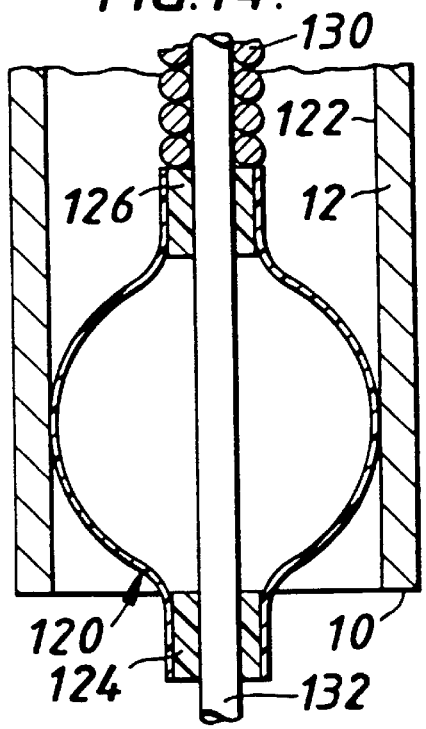
FIGS. 14 and 15 show, respectively, a fourth and a fifth embodiment of seal with part of a fourth and a fifth embodiment of elongate flexible assembly, in longitudinal section.

A fourth embodiment of seal 120 is shown in FIG. 14. In this case it seals on the inside wall surface 122 of the existing pipe 12. The seal 120 is advanced into the pipe 12 while it is deflated. Opposite ends of the seal 120 are attached to blocks 124, 126 the first clamped to the wire 128 and to the second attached to the end of the sleeve 130 of the elongate assembly. Compressed nitrogen is introduced into the seal 120 by a pipe (not shown) which extends within the elongate assembly.

The plastic pipe (not shown) carries a nose-piece as before having means (not shown) for preventing the sealant from advancing beyond the nose-piece. After the filling of the space between the existing pipe 12 and the plastic pipe has been completed, the seal 120 is deflated and collapsed by advance of the wire 132 relatively to the sleeve 130. The seal 120 is then withdrawn together with the elongate assembly.

Figure 15:
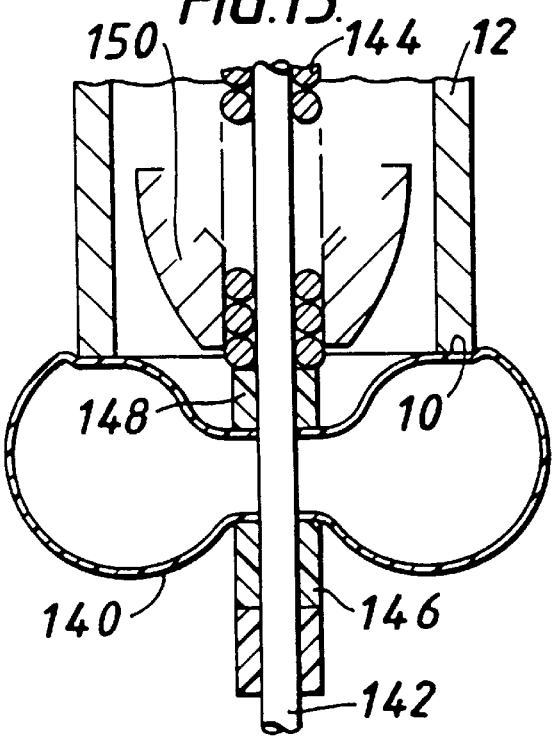

A fifth embodiment of seal 140 is shown in FIG. 15. In this embodiment the seal 140 is inflated similarly to the preceding embodiment but the seal 140 sealingly engages the end 10 of the existing pipe 12. The wire 142, the sleeve 144 the blocks 146, 148 and part of the nose-piece 150 carried by the plastic pipe (not shown) are also shown.

A sixth embodiment of seal 160 and part of the elongate assembly 162 are shown in FIGS. 16–18. The seal 160 is shown collapsed in FIG. 16. The seal 160 is annular and is bonded by a frangible bond to a polyurethane (for example) body 162 which is attached to the wire 164 of the elongate assembly 166.

The sleeve 168 of the elongate assembly 166 has at its end a nose-piece 170 having a bore with a step 172 in it. The assembly 166 and the plastic pipe 174 are fed into the existing pipe 12 together and, when the seal 160 is correctly positioned, the sleeve 168 is advanced relatively to the wire 164.

This causes the nose-piece 170 to advance into the sleeve 160. The nose-piece 170 is provided with a specially shaped outside nose surface 176 which acts upon the sleeve 160 and forces it outwardly. The seal 160 sealingly engages the inside wall surface 178.

At the same time the frangible bond between the seal 160 and the polyurethane body 162 is broken.

The space 180 between the plastic pipe 174 and the existing pipe 12 is filled with sealant and allowed to set.

The elongate assembly 166 is withdrawn from the plastic pipe 174 to leave the seal 160 behind as shown in FIG. 18.

FIGS. 19–22 show part of a seventh embodiment of flexible assembly 200 and a seventh embodiment of seal 210.

Figure 19:
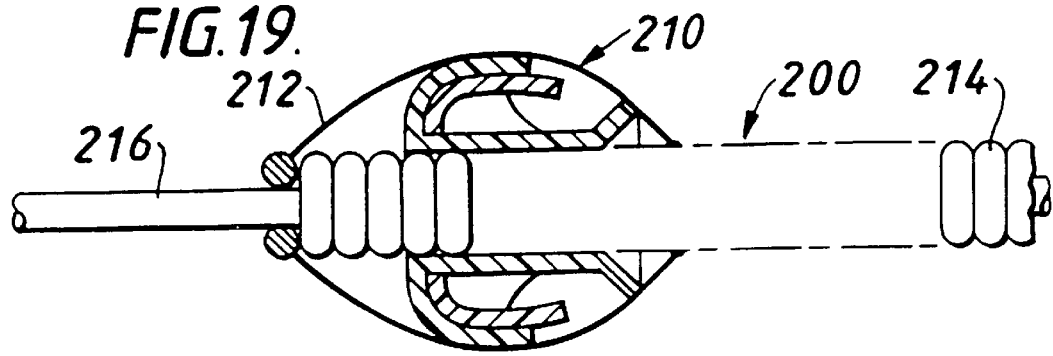
Figure 20:
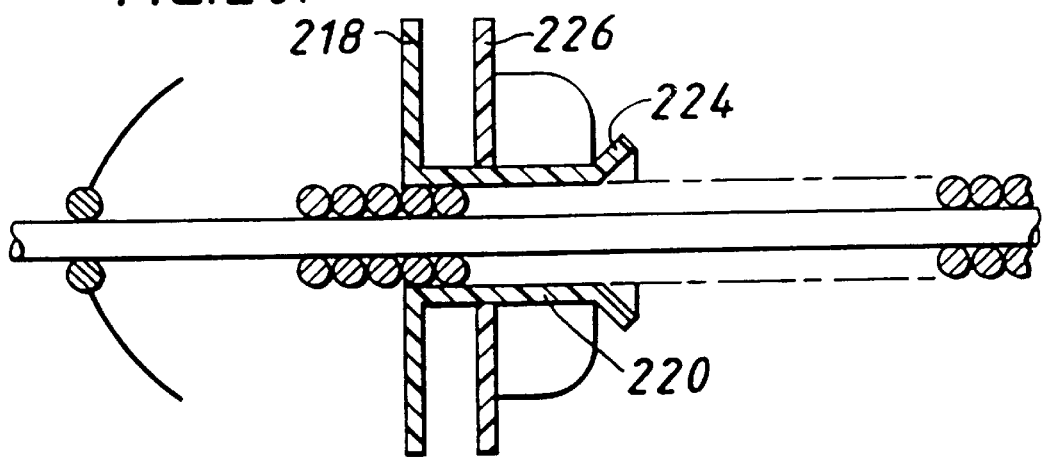

In FIG. 19 the seal 210 is shown folded into a collapsed condition in which it is held by filaments 212. The filaments 212 may be cords or wires, for example. The assembly 200 comprises a sleeve 214 and a wire 216. The rightward ends of the filaments 212 are secured to the sleeve 214 and the leftward ends of the filaments 212 are secured to the wire 216.

The seal 210 is inserted in the existing pipe 12 in the folded condition. When it has been advanced to a position in the main 14 beyond the end 10 of the pipe 12, the wire 216 is advanced relatively to the sleeve 214 to break the filaments 212. The seal 210 then deploys to the position shown in FIG. 20.

Figure 21:
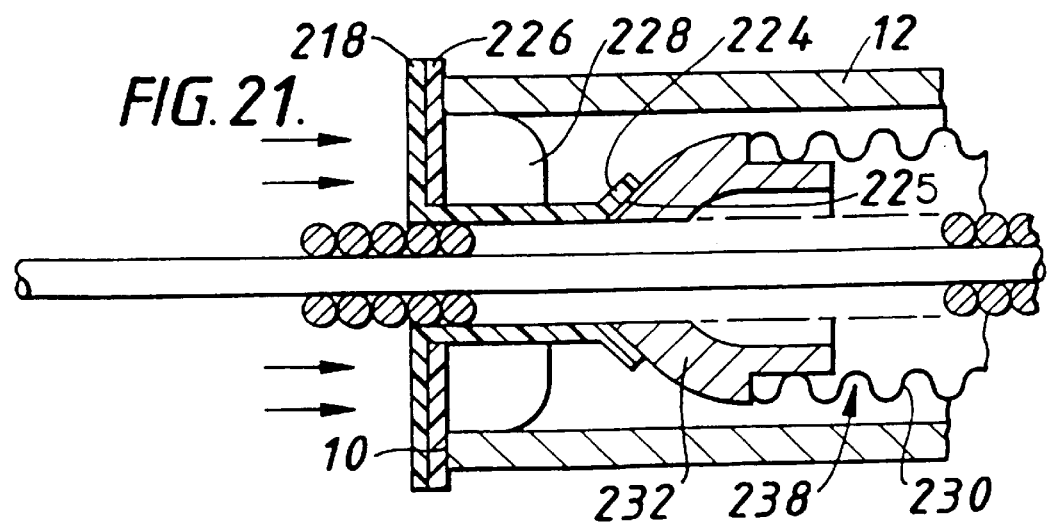

The assembly 200 is then retracted so that the seal 210 sealingly engages the end 10 of the existing pipe 12, as shown in FIG. 21.

The seal 210 comprises a circular disc 218 which is integral with a sleeve 220. The sleeve 220 is attached to the sleeve 214 of the elongate assembly 200. The sleeve 220 has a frusto-conical rightward end 224.

The sleeve 220 carries a loose circular seal body 226 which is integral with three diametrically extending ribs 228.

The plastic pipe 230 is next advanced in the existing pipe 12. The plastic pipe 230 carries a steel nose-piece 232 which eventually engages the frusto-conical end 224. Two electrical contacts 225 are both engaged by the nose-piece 232. The contracts 225 are connected to leads (not shown) which extend back through the assembly 200 and are connected in a circuit including for example a battery and a lamp (not shown). When the contacts 225 are bridged by the nose-piece 232 the lamp is illuminated and thus an indication is given that the plastic pipe 230 is correctly positioned.

Figure 22:
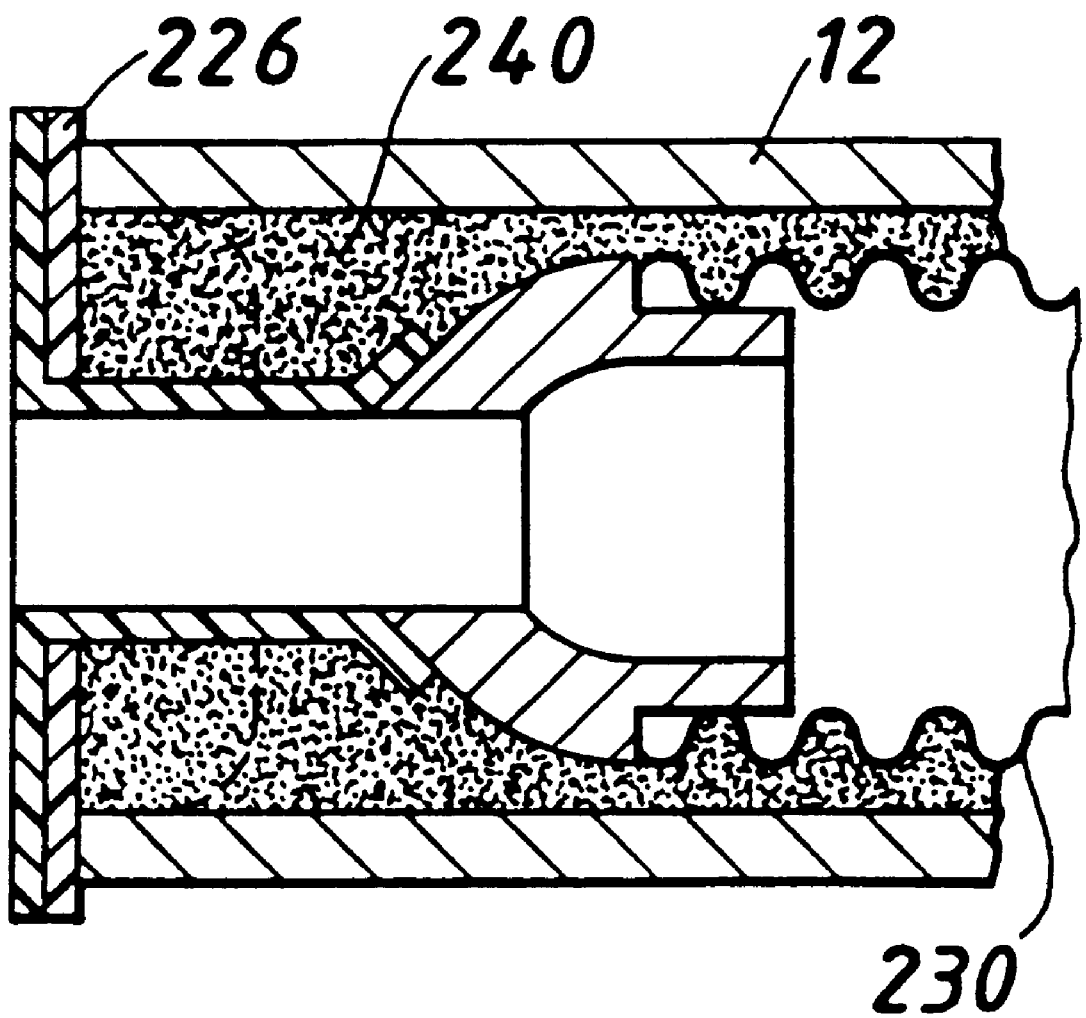

The space 238 between the existing pipe 12 and the plastic pipe 230 is filled with sealant 240 and allowed to set. The elongate assembly 200 is withdrawn leaving the seal 210 behind as shown in FIG. 22. The sleeve 220 is attached to the sleeve 214 by readily-frangible means, such as adhesive.

It will be understood that the sensor system described in our co-pending UK patent application No. 9503678.6 is applicable to this invention and enables the position of the elongate flexible assembly (such as the assembly 20 for example) to be accurately known in relation to the end of the existing service pipe 12 in the main 14; or in relation to the end of a tee in the main 14, the pipe 12 being connected to the tee. Beads 60 (corresponding to the bead 60 shown in FIGS. 3 to 6 above) are shown also in FIGS. 7–10, FIGS. 11 and 12 and FIG. 16.

In FIG. 16 a guide member 300 is partially shown and has the same purpose as the part of the flexible guide assembly shown extending beyond the bead 52 in our co-pending UK patent application No. 9503678.6.

In certain embodiments of apparatus according to the invention it may be preferable to position the bead 60 on the elongate flexible assembly on the other side of the seal.

What is claimed is:

1. A method of installing a plastic service pipe in an existing steel service pipe which extends from a main, or from a tee connected to a main, to an accessible end, said method comprising sealing said existing pipe using a seal deployed by an elongate flexible assembly which is fed into the existing pipe through said accessible end, the deployment of said seal being effected in such a manner as to cause the seal to move from a first position to an extended position to effect the seal, inserting a plastic service pipe in said steel service pipe over the flexible assembly, placing sealant in the space between said existing pipe and said plastic service pipe, and withdrawing said elongate flexible assembly.

2. A method according to claim 1 wherein said seal, when deployed engages an end of said existing pipe or an end of said tee.

3. A method according to claim 1 wherein said seals, when deployed, engages an inside wall surface of said existing pipe or of said tee.

4. A method according to claim 1 wherein said seal is withdrawn together with said elongate flexible assembly.

5. A method according to claim 1 wherein said plastic service pipe is fed into said existing pipe over said elongate flexible assembly after the insertion of the flexible assembly into the existing pipe.

6. A method according to claim 1, wherein said plastic pipe is fed over the flexible assembly prior to insertion of the flexible assembly into said existing pipe.

7. A method according to claim 1, wherein said seal has the shape of an umbrella when deployed.

8. A method according to claim 1, wherein said seal remains in said existing pipe after withdrawal of said elongate flexible assembly.

9. A method according to claim 1, wherein said seal is inflatable.

10. A method according to claim 1 wherein said seal is folded whilst it is advanced within said existing service pipe and wherein said seal unfolds into its deployed condition.

11. Apparatus for use in performing the method according to claim 1 comprising an elongate flexible assembly having a flexible wire surrounded by a flexible sleeve, said flexible assembly carrying a seal which can be extended to effect the seal, the assembly being configured to accept the passage of a plastic service pipe over the flexible sleeve and being configured to be capable of withdrawal through the bore of the plastic service pipe after effecting the seal.

12. Apparatus according to claim 11, wherein said seal comprises ribs having inner and outer ends, said ribs being pivotally connected at their inner ends to a leading end of said sleeve, the outer ends of said ribs being engageable with a lock body connected to said wire, said seal being deployed by manipulation of said flexible assembly and said seal being advanced through said existing pipe in retracted condition with the outer ends of said ribs engaging said lock body and being deployed by release of said outer ends of said ribs and by movement of said lock body against said ribs to push them into an open position and by movement of said lock body towards said existing service pipe.

13. Apparatus according to claim 11, wherein said seal comprises ribs pivotally connected at their inner ends to a body secured to said wire, the outer ends of said ribs being engageable with a lock body secured to the leading end of said sleeve, said seal being deployed by manipulation of said flexible assembly and said seal being advanced through said existing pipe in retracted condition with the outer ends of said ribs engaging said lock body and being deployed by release of said outer ends of said ribs and by movement of said lock body against said ribs and by movement of said body secured to said wire towards said existing service pipe.

14. Apparatus according to claim 11, wherein said seal is normally of circular shape but is held in a deformed elongate elliptical form by a former during feeding of said flexible assembly into said existing pipe, said seal being deployed by relative motion of said sleeve and said wire which breaks said former, said seal assuming a circular shape, and said seal being axially compressed by operation of said flexible assembly between a nose-piece carried by the leading end of said plastic pipe and a washer connected to said wire, said nose-piece engaging the forward end of said sleeve.

15. Apparatus according to claim 11, wherein said seal is in the form of an inflatable bag extending between two bodies, one of said bodies being connected to said wire and the other of said bodies engaging the forward end of said sleeve.

16. Apparatus according to claim 11, wherein said seal is connected by a frangible bond to a body connected to said wire and wherein, upon shearing of said frangible bond by manipulation of said elongate flexible assembly, said seal is forced outwardly by a nose-shaped surface on a nose-piece carried by the leading end of said plastic pipe, which nose-piece has an internal step engaged by the leding end of said sleeve.

17. Apparatus according to claim 11, wherein said seal is mounted on said sleeve adjacent the leading end thereof and is held by frangible filaments in a folded condition during advance of said flexible assembly through said existing pipe, said filaments being broken by manipulation of said flexible assembly to allow said seal to deploy by unfolding to assume an annular shape.

18. Apparatus according to claim 17, wherein said seal is mounted on a tubular member supported upon said sleeve, said tubular member terminating in a frusto-conical end position which is engaged by a nose-piece carried by the leading end of said plastic pipe.

* * * * *